(12) United States Patent
Sharma

(10) Patent No.: US 10,965,598 B1
(45) Date of Patent: Mar. 30, 2021

(54) LOAD BALANCING IN A SERVICE CHAIN

(71) Applicant: Cisco Technology, Inc., San Jose, CA (US)

(72) Inventor: Samar Sharma, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/109,003

(22) Filed: Aug. 22, 2018

Related U.S. Application Data

(60) Provisional application No. 62/567,920, filed on Oct. 4, 2017.

(51) Int. Cl.
| | | |
|---|---|---|
| *H04L 12/803* | (2013.01) | |
| *H04L 29/12* | (2006.01) | |
| *H04L 12/743* | (2013.01) | |
| *H04L 29/06* | (2006.01) | |

(52) U.S. Cl.
CPC ........ *H04L 47/125* (2013.01); *H04L 45/7453* (2013.01); *H04L 61/2007* (2013.01); *H04L 63/101* (2013.01)

(58) Field of Classification Search
None
See application file for complete search history.

(56) References Cited

U.S. PATENT DOCUMENTS

| | | |
|---|---|---|
| 6,175,874 B1 | 1/2001 | Imai et al. |
| 6,182,097 B1 | 1/2001 | Hansen et al. |
| 6,259,705 B1 | 7/2001 | Takahashi |
| 6,601,084 B1 | 7/2003 | Bhaskaran et al. |
| 6,643,260 B1 | 11/2003 | Kloth et al. |
| 6,683,873 B1 | 1/2004 | Kwok et al. |
| 6,721,800 B1 * | 4/2004 | Basso ............... H04L 45/00 709/239 |
| 6,735,631 B1 | 5/2004 | Oehrke et al. |
| 6,779,039 B1 | 8/2004 | Bommareddy et al. |
| 6,996,615 B1 | 2/2006 | McGuire |

(Continued)

OTHER PUBLICATIONS

Karadeniz, et al., "Hardware Design and Implementation of a Network-on-Chip Based Load Balancing Switch Fabric," IEEE, 2012 International Conference on Reconfigurable Computing and FPGAs, Dec. 2012, 7 pages.

(Continued)

*Primary Examiner* — Jenkey Van
(74) *Attorney, Agent, or Firm* — Edell, Shapiro & Finnan, LLC

(57) ABSTRACT

A method including: storing, in at least one hardware module of a network device having a plurality of ports, attributes for at least one access control list and associated actions that cause network packets received at one of the plurality of ports that match the attributes for the at least one access control list, to be directed into a service chain that includes at least a first application performed by any one of a first plurality of redundant network processing appliance elements connected to another port of the plurality of ports; directing received network packets that match the attributes for the at least one access control list into the service chain; and load balancing network packets among the first plurality of redundant network processing appliance elements for the first application based on the attributes stored in the at least one hardware module of the network device.

20 Claims, 12 Drawing Sheets

(56) References Cited

U.S. PATENT DOCUMENTS

| | | | |
|---|---|---|---|
| 7,062,571 B1 | 6/2006 | Dale et al. | |
| 7,284,053 B1 | 10/2007 | O'Rourke et al. | |
| 7,313,667 B1 | 12/2007 | Pullela et al. | |
| 7,328,237 B1 | 2/2008 | Thubert et al. | |
| 7,536,476 B1 | 5/2009 | Alleyne | |
| 7,542,423 B1 | 6/2009 | Morishige et al. | |
| 7,567,504 B2 | 7/2009 | Darling et al. | |
| 7,623,455 B2 | 11/2009 | Hilla et al. | |
| 7,808,897 B1 | 10/2010 | Mehta et al. | |
| 7,852,774 B2 | 12/2010 | Shen et al. | |
| 8,014,278 B1* | 9/2011 | Subramanian | H04L 12/2867 370/229 |
| 8,259,722 B1 | 9/2012 | Kharitonov | |
| 8,284,664 B1 | 10/2012 | Aybay et al. | |
| 8,301,645 B1 | 10/2012 | Crook | |
| 8,467,294 B2* | 6/2013 | Raman | H04L 47/125 370/235 |
| 8,510,469 B2 | 8/2013 | Portolani | |
| 8,553,552 B2 | 10/2013 | Hu et al. | |
| 8,611,356 B2 | 12/2013 | Yu et al. | |
| 8,868,726 B1 | 10/2014 | Tu et al. | |
| 8,937,942 B1 | 1/2015 | Li et al. | |
| 9,178,807 B1 | 11/2015 | Chua et al. | |
| 9,246,998 B2 | 1/2016 | Kumar et al. | |
| 9,258,243 B2 | 2/2016 | Guichard et al. | |
| 9,397,946 B1* | 7/2016 | Yadav | H04L 41/0806 |
| 9,432,294 B1 | 8/2016 | Sharma et al. | |
| 9,444,744 B1 | 9/2016 | Sharma et al. | |
| 9,565,135 B2 | 2/2017 | Li et al. | |
| 9,755,959 B2 | 9/2017 | Guichard et al. | |
| 9,825,865 B1 | 11/2017 | Sharma et al. | |
| 9,853,898 B1 | 12/2017 | Subramanian et al. | |
| 10,108,791 B1 | 10/2018 | Masterman | |
| 2002/0184368 A1 | 12/2002 | Wang | |
| 2003/0056001 A1 | 3/2003 | Mate et al. | |
| 2003/0097405 A1 | 5/2003 | Laux et al. | |
| 2004/0004941 A1 | 1/2004 | Malan et al. | |
| 2004/0258062 A1 | 12/2004 | Narvaez | |
| 2004/0264481 A1 | 12/2004 | Darling et al. | |
| 2004/0267920 A1 | 12/2004 | Hydrie et al. | |
| 2005/0027858 A1 | 2/2005 | Sloth et al. | |
| 2005/0125424 A1 | 6/2005 | Herriott et al. | |
| 2005/0207420 A1 | 9/2005 | Shanklin | |
| 2005/0249199 A1 | 11/2005 | Albert et al. | |
| 2005/0281205 A1 | 12/2005 | Chandwadkar et al. | |
| 2005/0281257 A1 | 12/2005 | Yazaki et al. | |
| 2006/0098573 A1 | 5/2006 | Beer et al. | |
| 2006/0104286 A1 | 5/2006 | Cheriton | |
| 2006/0133371 A1 | 6/2006 | Matoba et al. | |
| 2006/0155875 A1 | 7/2006 | Cheriton | |
| 2006/0227705 A1 | 12/2006 | Chandwadkar et al. | |
| 2007/0016670 A1 | 1/2007 | Cooper | |
| 2007/0165622 A1 | 7/2007 | O'Rourke et al. | |
| 2008/0084880 A1 | 4/2008 | Dharwadkar | |
| 2009/0135722 A1 | 5/2009 | Boers et al. | |
| 2009/0198724 A1 | 8/2009 | Valimaki et al. | |
| 2009/0304007 A1 | 12/2009 | Tanaka et al. | |
| 2010/0251128 A1 | 9/2010 | Cordasco | |
| 2011/0055470 A1 | 3/2011 | Portolani | |
| 2011/0110382 A1 | 5/2011 | Jabr et al. | |
| 2011/0116443 A1 | 5/2011 | Yu et al. | |
| 2011/0235508 A1 | 9/2011 | Goel et al. | |
| 2011/0261811 A1 | 10/2011 | Battestilli et al. | |
| 2011/0283013 A1 | 11/2011 | Grosser et al. | |
| 2012/0163164 A1 | 6/2012 | Terry et al. | |
| 2012/0163180 A1 | 6/2012 | Goel | |
| 2012/0188891 A1 | 7/2012 | Vaelimaa et al. | |
| 2012/0201135 A1 | 8/2012 | Ding et al. | |
| 2012/0246637 A1 | 9/2012 | Kreeger et al. | |
| 2012/0303809 A1 | 11/2012 | Patel et al. | |
| 2012/0317276 A1 | 12/2012 | Muniraju | |
| 2013/0044636 A1 | 2/2013 | Kopenen et al. | |
| 2013/0201989 A1 | 8/2013 | Hu et al. | |
| 2013/0235868 A1 | 9/2013 | Owens et al. | |
| 2013/0272305 A1 | 10/2013 | Lefebvre et al. | |
| 2013/0298243 A1 | 11/2013 | Kumar et al. | |
| 2013/0343408 A1 | 12/2013 | Cook et al. | |
| 2014/0006535 A1 | 1/2014 | Reddy | |
| 2014/0019602 A1 | 1/2014 | Murthy et al. | |
| 2014/0025986 A1 | 1/2014 | Kalyanaraman et al. | |
| 2014/0075108 A1 | 3/2014 | Dong et al. | |
| 2014/0233564 A1 | 8/2014 | Lue et al. | |
| 2014/0282611 A1 | 9/2014 | Campbell et al. | |
| 2014/0307553 A1 | 10/2014 | Fung | |
| 2014/0307580 A1 | 10/2014 | Fung | |
| 2014/0321462 A1 | 10/2014 | Kancherla et al. | |
| 2014/0341029 A1* | 11/2014 | Allan | H04L 47/125 370/235 |
| 2014/0372567 A1 | 12/2014 | Ganesh et al. | |
| 2015/0081762 A1* | 3/2015 | Mason | H04L 45/72 709/203 |
| 2015/0085870 A1* | 3/2015 | Narasimha | H04L 49/70 370/409 |
| 2015/0117458 A1 | 4/2015 | Gurkan et al. | |
| 2015/0124815 A1* | 5/2015 | Beliveau | H04L 45/7453 370/392 |
| 2015/0207741 A1 | 7/2015 | Luo et al. | |
| 2015/0215819 A1 | 7/2015 | Bosch et al. | |
| 2015/0355946 A1 | 12/2015 | Kang | |
| 2015/0381560 A1 | 12/2015 | Chippa et al. | |
| 2016/0087887 A1 | 3/2016 | Fung | |
| 2016/0094643 A1 | 3/2016 | Jain et al. | |
| 2016/0182378 A1 | 6/2016 | Basavaraja et al. | |
| 2016/0182379 A1 | 6/2016 | Mehra et al. | |
| 2016/0212048 A1 | 7/2016 | Kaempfer et al. | |
| 2016/0218918 A1* | 7/2016 | Chu | H04L 41/12 |
| 2016/0241436 A1 | 8/2016 | Fourie et al. | |
| 2016/0241491 A1 | 8/2016 | Tripathi et al. | |
| 2016/0251607 A1 | 9/2016 | Kloos | |
| 2016/0261497 A1 | 9/2016 | Arisoylu et al. | |
| 2016/0269295 A1 | 9/2016 | A S et al. | |
| 2016/0283290 A1 | 9/2016 | Porat | |
| 2016/0316005 A1 | 10/2016 | Thirumurthi et al. | |
| 2016/0345814 A1 | 10/2016 | Thirumurthi et al. | |
| 2016/0328159 A1 | 11/2016 | Coddington et al. | |
| 2016/0337244 A1 | 11/2016 | Baveja et al. | |
| 2017/0171343 A1 | 1/2017 | Venkataramanan et al. | |
| 2017/0031704 A1 | 2/2017 | Sudhakaran et al. | |
| 2017/0093670 A1 | 3/2017 | Dinan et al. | |
| 2017/0118069 A1 | 4/2017 | Sharma et al. | |
| 2017/0118088 A1 | 4/2017 | Koizumi | |
| 2017/0118116 A1* | 4/2017 | Baveja | H04L 45/745 |
| 2017/0149632 A1 | 5/2017 | Saltsidis et al. | |
| 2017/0214719 A1 | 7/2017 | Mohan et al. | |
| 2018/0091420 A1* | 3/2018 | Drake | H04L 67/327 |

OTHER PUBLICATIONS

Wang, et al., "Load-Balancing Behind Switch Fabrics," EE Times, designlines, Wireless & Networking, Design How-To, Sep. 25, 2001, 5 pages.

Parissis, Booking.com, "Distributed Load Balancing, Real Case Example Using Open Source on Commodity Hardware," LinuxConf Berlin, Oct. 2016, 20 pages.

Zhang, et al., "L4-L7 Service Function Chaining Solution Architecture," Version 1.0, Open Networking Foundation, Technical Specification, Jun. 2015, 36 pages.

Kumbhare, et al., "OpenDaylight Service Function Chaining Use-Cases," Ericsson, OpenDaylight, SDN OpenFlow World Congress, Oct. 2014, 25 pages.

Su, et al., "An OpenFlow-based Dynamic Service Chaining Approach for Hybrid Network Functions Virtualization," Proceedings of the 4th IIAE International Conference on Industrial Application Engineering, Mar. 2016, 6 pages.

Blendin, et al., "Position Paper: Software-Defined Network Service Chaining," IEEE, 2014 Third European Workshop on Software Defined Networks, Sep. 2014, 6 pages.

Samar Sharma, "Catena", https://blogs.cisco.com/datacenter/catena, Mar. 27, 2017, 8 pages.

"Cisco Nexus 7000 Series Switches Command Reference: The Catena Solution", Feb. 14, 2017, 48 pages.

(56) References Cited

OTHER PUBLICATIONS

"Cisco Nexus 7000 Series Switches Configuration Guide: The Catena Solution", Dec. 21, 2016, 28 pages.

* cited by examiner

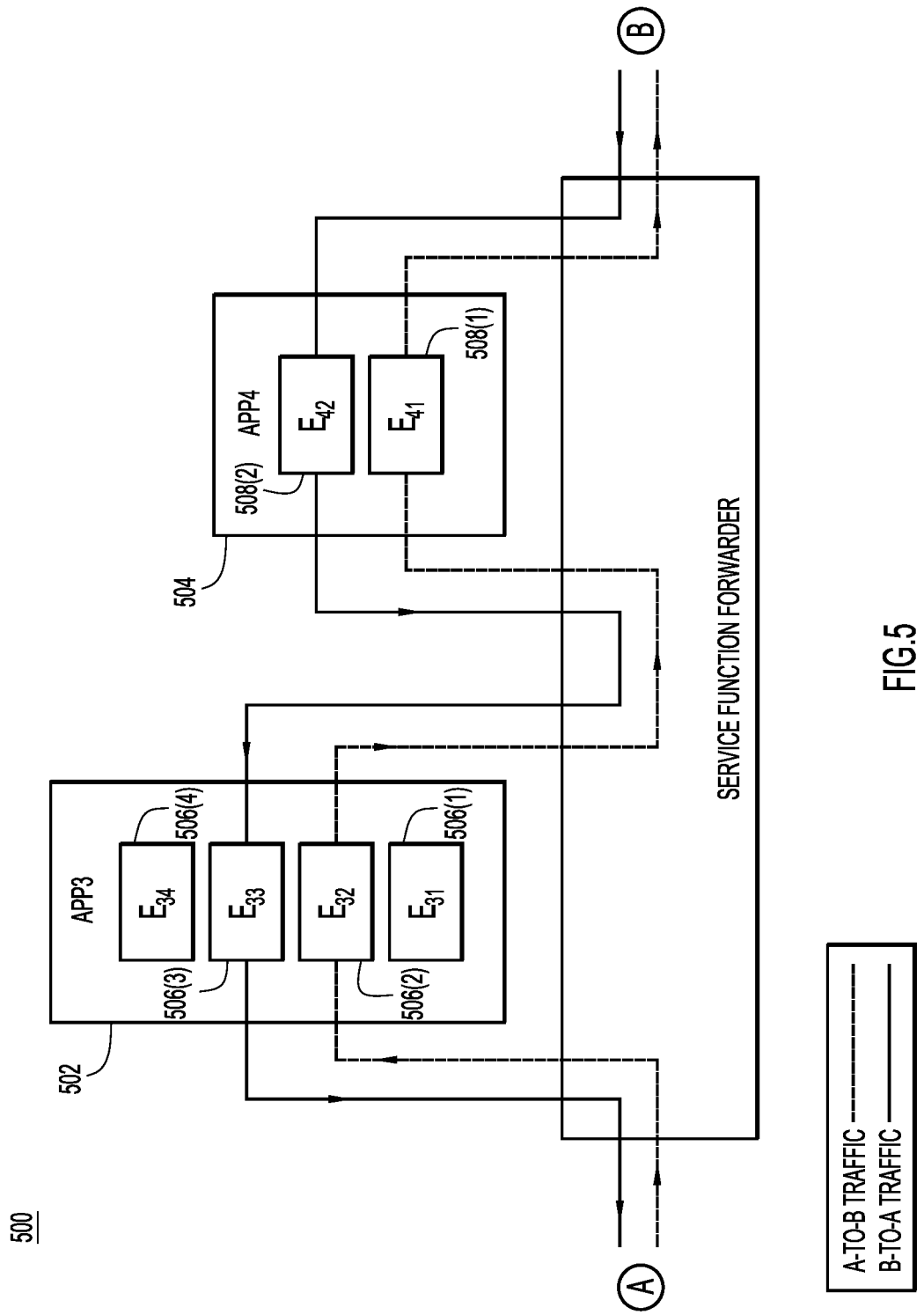

1100

1102 — STORE, IN AT LEAST ONE HARDWARE MODULE OF A NETWORK DEVICE HAVING A PLURALITY OF PORTS, ATTRIBUTES FOR AT LEAST ONE ACCESS CONTROL LIST AND ASSOCIATED ACTIONS THAT CAUSE NETWORK PACKETS RECEIVED AT ONE OF THE PORTS THAT MATCH THE ATTRIBUTES FOR THE AT LEAST ONE ACCESS CONTROL LIST, TO BE DIRECTED IN A SERVICE CHAIN THAT INCLUDES AT LEAST ONE NETWORK PROCESSING APPLIANCE CONNECTED TO ANOTHER ONE OF THE PORTS; WHEREIN STORING INCLUDES STORING ATTRIBUTES FOR LOAD BALANCING NETWORK PACKETS AMONG A PLURALITY OF REDUNDANT ELEMENTS OF EACH OF THE NETWORK PROCESSING APPLIANCES, AND THE LOAD BALANCING OF NETWORK PACKETS INCLUDES AT LEAST ONE OF EITHER HASH-BASED LOAD BALANCING OR TERNARY CONTENT-ADDRESSABLE MEMORY (TCAM)-BASED LOAD BALANCING

1104 — DIRECT RECEIVED NETWORK PACKETS THAT MATCH THE ATTRIBUTES FOR THE AT LEAST ONE ACCESS CONTROL LIST THROUGH THE SERVICE CHAIN

1106 — LOAD BALANCE NETWORK PACKETS AMONG THE FIRST PLURALITY OF REDUNDANT NETWORK PROCESSING APPLIANCE ELEMENTS FOR THE FIRST APPLICATION BASED ON THE ATTRIBUTES STORED IN THE AT LEAST ONE HARDWARE MODULE OF THE NETWORK DEVICE

FIG.11

LOAD BALANCING IN A SERVICE CHAIN

PRIORITY CLAIM

This application claims priority to U.S. Provisional Application No. 62/567,920 filed Oct. 4, 2017, the entirety of which is incorporated herein by reference.

TECHNICAL FIELD

This disclosure relates in general to the field of communications and, more particularly, to service chaining without any additional packet headers.

BACKGROUND

End users have more communications choices than ever before. A number of prominent technological trends are currently afoot (e.g., more computing devices, more online video services, more Internet video traffic), and these trends are changing the network delivery landscape. One of these trends is service chaining. Service chaining is an emerging set of technologies and processes that enable operators to configure network services dynamically in software without having to make changes to the network at the hardware level.

BRIEF DESCRIPTION OF THE DRAWINGS

FIG. 5 is a block diagram of a conventional network environment that is not configured to perform symmetric service chaining.

FIG. 11 is a flow chart of a method, according to an example embodiment.

DESCRIPTION OF EXAMPLE EMBODIMENTS

Overview

Presented herein are service chaining techniques for selective traffic redirection based on Access Control List (ACL) configurations on switches. Network traffic forwarded along a service chain may be load-balanced across multiple elements of the chain. In one embodiment, a method involves storing, in at least one hardware module of a network device having a plurality of ports, attributes for at least one access control list and associated actions that cause network packets received at one of the plurality of ports that match the attributes for the at least one access control list, to be directed into a service chain that includes at least a first application performed by any one of a first plurality of redundant network processing appliance elements connected to another port of the plurality of ports. Received network packets that match the attributes for the at least one access control list are directed into the service chain. The network device load balances the network packets among the first plurality of redundant network processing appliance elements for the first application based on the attributes stored in the at least one hardware module of the network device.

Example Embodiments

Presented herein are techniques for service chaining without any additional packet headers. This allows for health monitoring and automatic failure handling and transparent insertion of appliances (configurations not required) with wire-speed performance. These techniques may be implemented on existing Application Specific Integrated Circuits (ASICs) and linecards in switches (e.g., datacenter switches), and allow for selective traffic redirection based on ACL configuration. For example, if traffic matches an entry in an ACL, that traffic may be forwarded as indicated in the ACL, e.g., to an application configured to provide one or more network services. As provided herein, redirecting traffic based on ACL configuration also permits load-balancing in the service chain.

Figure 1:
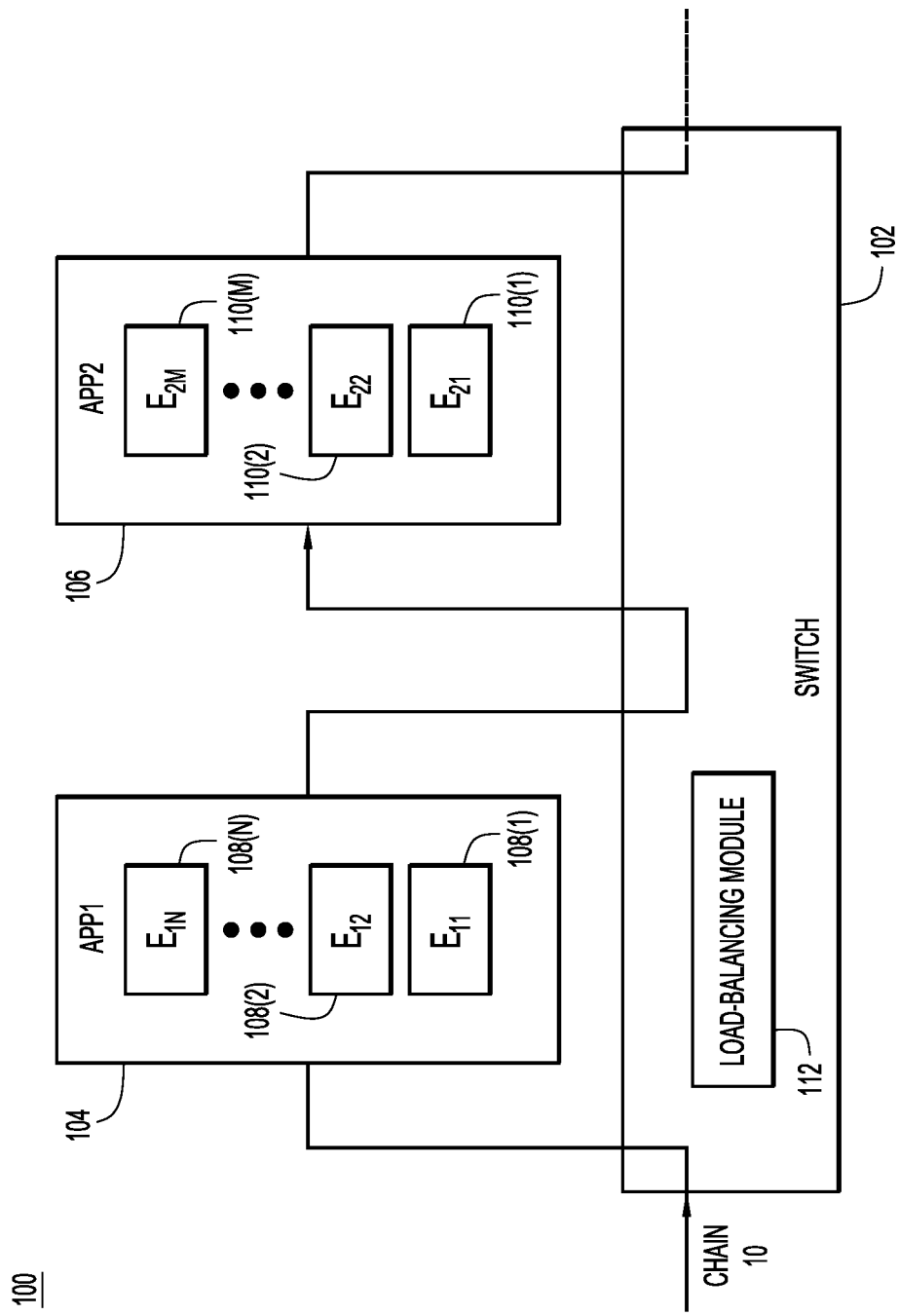
FIG. 1 is a block diagram of a network environment in which a switch is configured to load balance network traffic within service chains, according to an example embodiment.

FIG. 1 is a block diagram of a network environment 100 in which a switch is configured to load balance network traffic within service chains supported by the switch, in accordance with an example embodiment. The network environment 100 includes a switch 102 and two applications (application 1 (App$_1$) identified by reference numeral 104 and application 2 (App$_2$) identified by reference numeral 106). Both applications 104, 106 may be configured to perform a network service function, and the switch 102 may be configured to forward network traffic to one or more of the applications as indicated in an ACL configured on the switch 102.

The path that each type of network traffic follows through the application(s) from the switch is referred to as a service chain (or "chain"). FIG. 1 illustrates an example chain (chain 10) for a specific type of network traffic. Chain 10 includes both applications 1 and 2. As shown in FIG. 1, the path for traffic for Chain 10 goes through application 1 and application 2. Multiple elements may run applications 1 and 2 in parallel. In this example, elements E11 108(1), E12 108(2), . . . E1N 108(n) run application 1, and elements E21 110(1), E22 110(2), . . . E2M 110(m) run application 2. In other words, there are N redundant elements that perform the function of application 1, and M redundant elements that perform the function of application 2. These elements may be, for example, different containers, virtual machines, and/or physical devices. The elements may include firewalls, intrusion prevention systems, Layer 7 load balancers, network address translation systems, etc. Some or all of the N redundant elements that perform the function of application 1 104 may be, for example, active concurrently. Some or all of the M redundant elements that perform the function of application 2 106 may be, for example, active concurrently.

Figure 2:
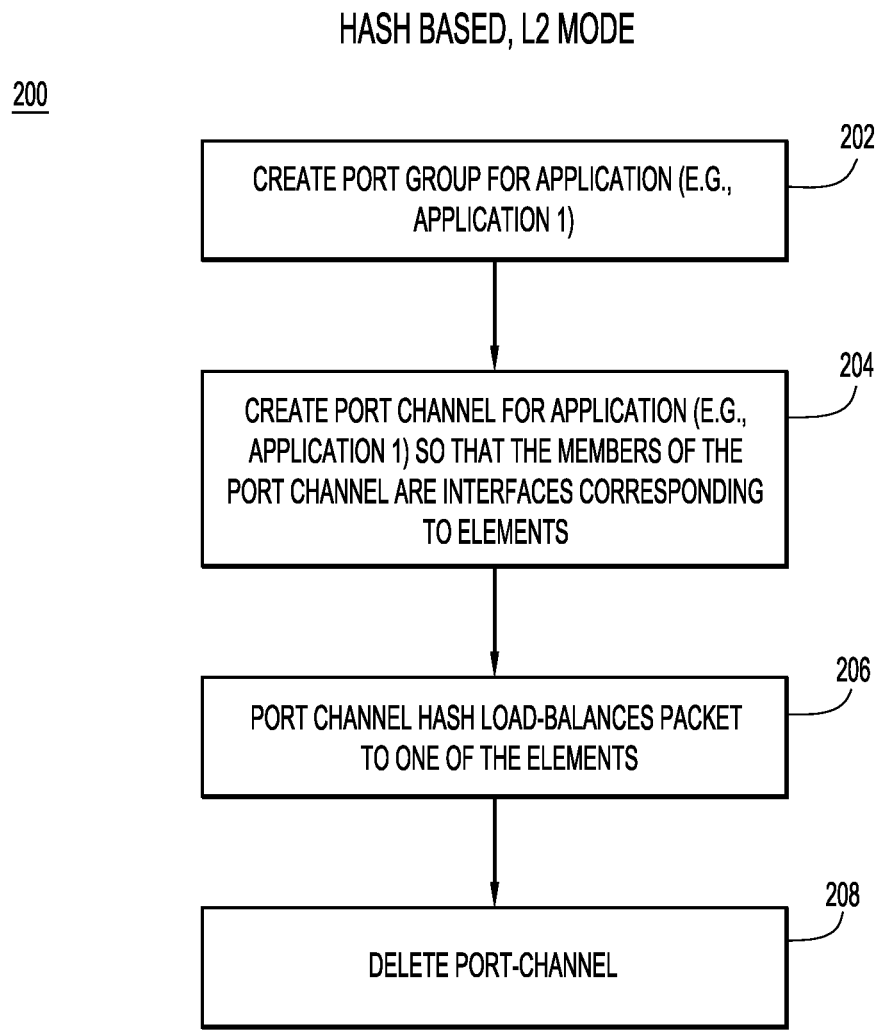
FIG. 2 is a flowchart of a method of performing hash-based load balancing techniques in Layer 2 mode, according to an example embodiment.
Figure 3:
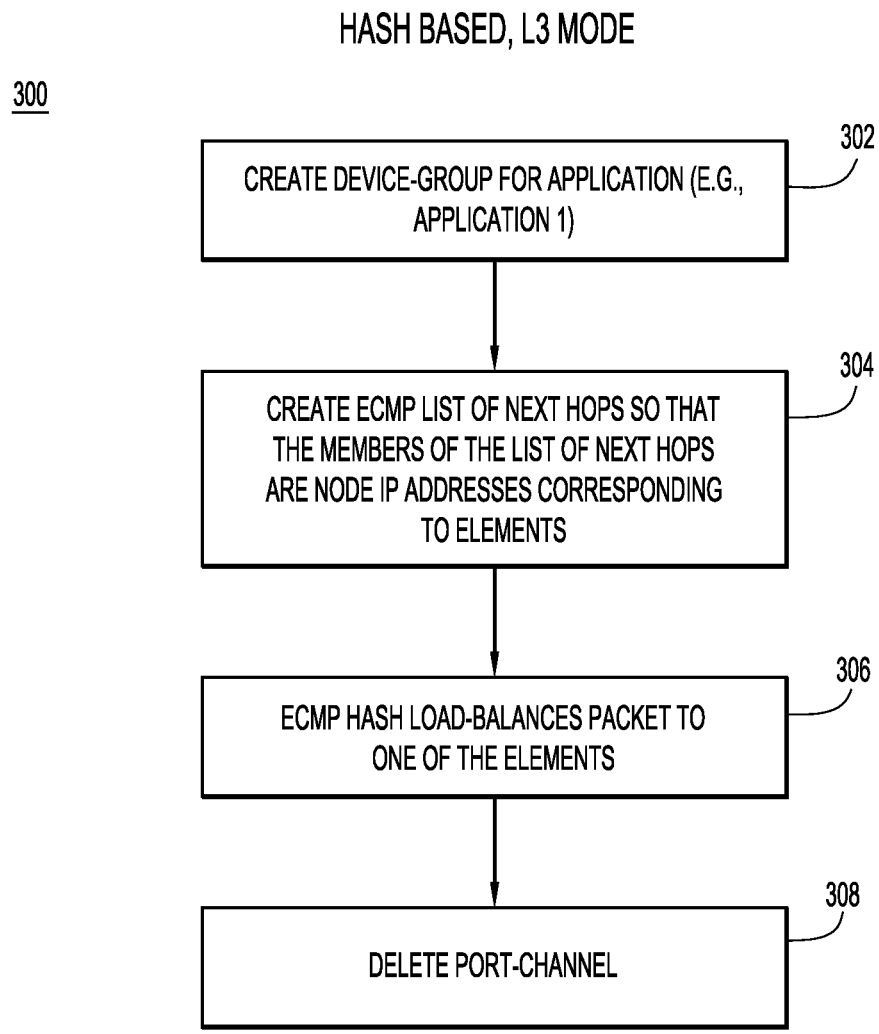
FIG. 3 is a flowchart of a method of performing hash-based load balancing techniques in Layer 3 mode, according to an example embodiment.
Figure 4B:
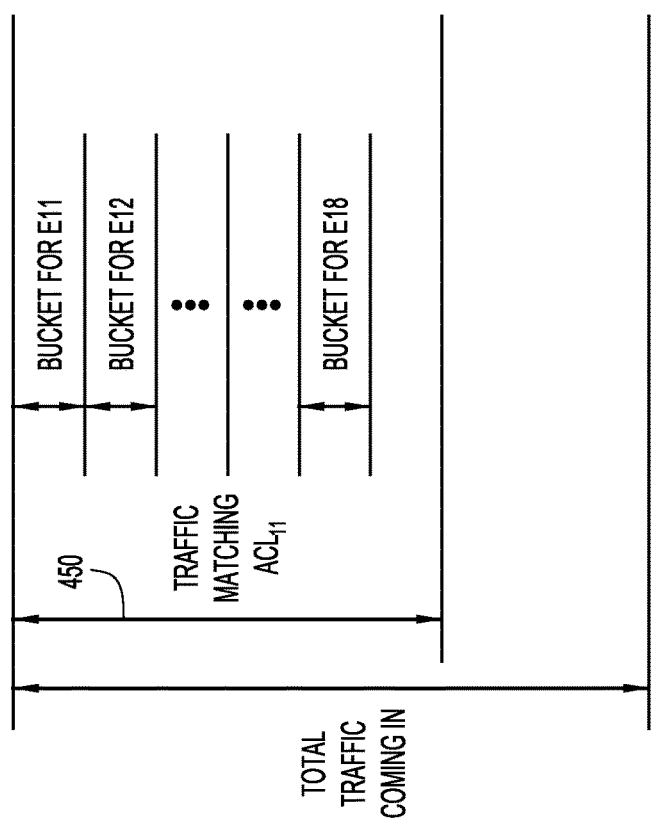
FIG. 4B is a diagrammatic illustration of TCAM-based load balancing techniques, according to an example embodiment.
Figure 4A:
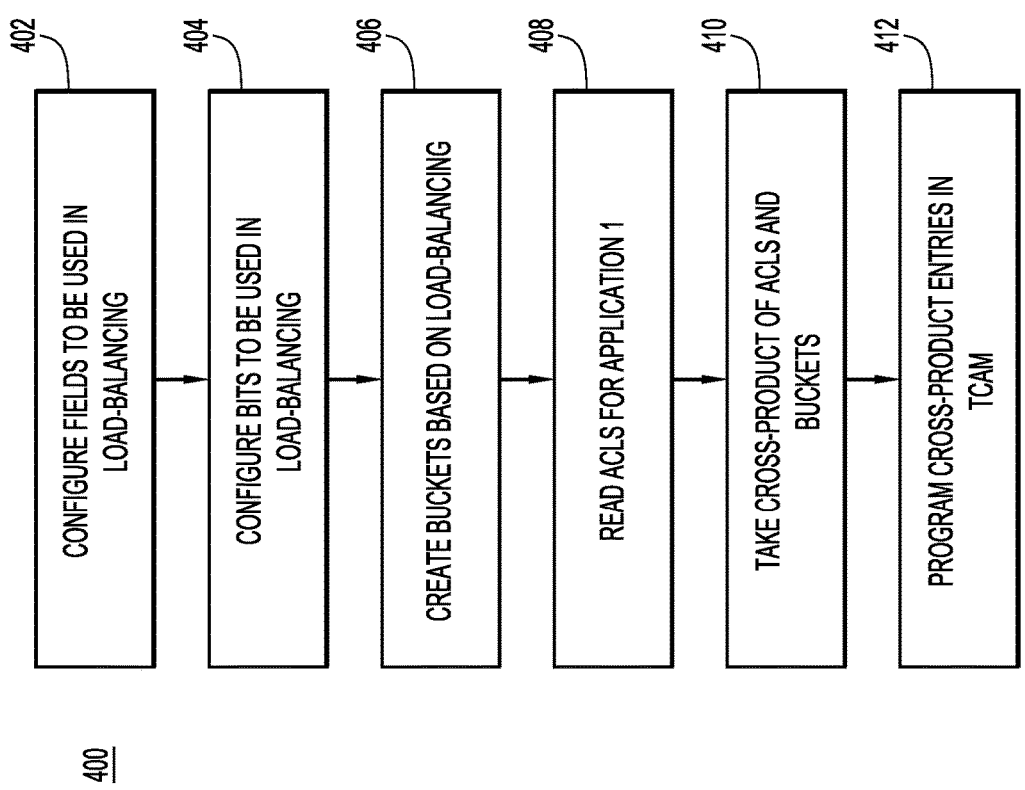
FIG. 4A is a flowchart of a method of performing ternary content-addressable memory (TCAM)-based load balancing techniques, according to an example embodiment.

As described herein, the load balancing module 112 of the switch 102 may enable load balancing of network traffic between these elements. For application 1, the network traffic may be load balanced among elements E11 108(1), E12 108(2), . . . E1N 108(n), and for application 2, the network traffic may be load balanced among elements E21 110(1), E22 110(2), . . . E2M 110(m). There are at least two techniques for performing such load balancing techniques: hash-based load balancing and ternary content-addressable memory (TCAM) based load balancing. FIGS. 2 and 3 relate to hash-based load balancing, and FIGS. 4A and 4B illustrate TCAM-based load balancing.

With respect to hash-based load balancing, hardware in the switch 102 computes a hash using the source IP address, destination IP address, and/or other fields in the header of packets of the network traffic. The hardware in the switch 102 may determine to which element to send a packet based on the hash. The hardware may be configured to send the network traffic to a particular application (e.g., application 1), and the hardware may determine which particular element (e.g., element E12 108(1)) to which to send the traffic. For example, the hardware in the switch 102 may determine to send a packet to application 1, and the hardware in the switch 102 may determine, based on a hash of a header of the packet (e.g., a header including a source IP address, a destination IP address and/or one or more other fields) to send the packet to a particular element of a plurality of redundant elements that are configured to perform the function of application 1.

There are two modes of hash-based load balancing: Layer 2 (L2) mode and Layer 3 (L3) mode. FIG. 2 illustrates a method 200 involving L2 mode, and FIG. 3 illustrates a method 300 involving L3 mode. Referring first to FIG. 2, at 202, a port group for an application (e.g., application 1) may be created. For example, the port group for application 1 may be as follows:

port-group {
  interface 11
  interface 12
. . .
  interface 1N
}

Interface 11 may be, for example, an interface between the switch 102 and element E11 108(1) (e.g., an egress port from the switch 102 to element E11 108(1)). At 204, a port channel for the application (e.g., application 1) may be created so that members of the port channel are interfaces corresponding to elements. A port channel (e.g., ether channel) may have multiple interfaces, and network traffic may be distributed among those interfaces. Specifically, elements E11 108(1), E12 108(2), . . . E1N 108(n) may be added to the port channel, and may correspond to interfaces 11, 12, . . . 1N, respectively. At 206, the port channel may be used to hash load-balance a packet of the network traffic to one of the elements E11 108(1), E12 108(2), . . . E1N 108(n). For example, for a packet destined to a port-channel, the hardware looks at the packet to determine the source IP address, destination IP address, and/or Layer 4 port number, and performs a hash function using one or more of the parameters. The hardware may then perform a hash modulo x operation, where "x" is the number of ports in the port-channel. At 208, the port channel may also be deleted (e.g., when the port group is removed by a user).

Turning now to FIG. 3, FIG. 3 illustrates a method of hash-based load balancing in L3 mode. At 302, a device group may be created for an application (e.g., application 1). For example, the device group for application 1 may be as follows:

device-group {
  Node IP 11
  Node IP 12
. . .
  Node IP IN
}

Node IP 11 may be, for example, an IP address corresponding to element E11 108(1). At 304, an Equal-Cost Multi-Path (ECMP) list of next hops may be created so that the members of the list of next hops are node IP addresses corresponding to elements. At 306, when a packet is sent to this ECMP "group," the packet may be hash load-balanced to one of the elements E11 108(1), E12 108(2), . . . E1N 108(n). At 308, the device group may also be deleted (e.g., when the port group is removed by a user).

As opposed to hardware-based hash load balancing, TCAM-based load balancing is controlled by software running on the switch. FIG. 4A illustrates an example method 400 of TCAM-based load balancing at the control plane. At 402, a user may optionally configure fields (e.g., source IP address, destination IP address, Layer 4 port number, etc.) to be used in load-balancing. At 404, the user may also optionally configure the bits (e.g., bits 24-27 of an IP address) to be used in load-balancing. At 406, buckets may be created based on load-balancing. For example, a source IP address having the sequence "000" at bits 24-26 may be load-balanced to element E11; a source IP address having the sequence "001" at bits 24-26 may be load-balanced to element E12; and so on (e.g., a source IP address having the sequence "111" at bits 24-26 may be load-balanced to element 18).

The buckets may be created based on one or more of source IP address, destination IP address, source Layer 4 port number, and/or destination Layer 4 port number. For example, if source IP address is a parameter used for bucketing, the incoming source IP addresses may be broken up into ranges such that if the last 3 bits are 000, 001, 010, 011, 100, 101, 110, 111, then the traffic is sent to device 1 through device 8, respectively. The buckets may look like:

*.*.*.*000→Device 1
*.*.*.*001→Device 2
*.*.*.*010→Device 3
*.*.*.*011→Device 4
*.*.*.*100→Device 5
*.*.*.*101→Device 6
*.*.*.*110→Device 7
*.*.*.*111→Device 8

In the above example buckets, the "*" represents "don't care" bits. Although the example buckets are described using source IP addresses, buckets may be created using one or more other fields of packet headers, in addition to or instead of using source IP addresses. More than one bucket may be mapped to one device. Although the example buckets are described using the last 3 bits, other bits of source IP addresses may be used and/or other bits of other parameters (e.g., destination IP address, source Layer 4 port number, and/or destination Layer 4 port number) may be used. For example, for device 1 and device 2, buckets may be created as follows:

*.*.*.*000.*→Device 1
*.*.*.*001.*→Device 2

At 408, the user-created ACLs for application 1 may be read. For example, network traffic corresponding to chain 10 may be forwarded to application 1 based on an ACL match (e.g., ACL 11), and the network traffic may also be forwarded to application 2 based on an ACL match (e.g., ACL 12). Network traffic corresponding to a second chain (chain 20) may be forwarded to application 2 based on an ACL match (e.g., ACL 21). At 410, the cross-product of the ACLs and the buckets may be determined for each chain ACL for application 1. At 412, cross-product entries may be programmed into the TCAM.

For example, network traffic corresponding to chain 10 may be forwarded to device-group 1 based on an ACL match (e.g., ACL 11) and may be forwarded to device-group 2 based on an ACL match (e.g., ACL 12). The ACL 11 may, for example, allow/permit network traffic with a source IP address 2.2. * . * . For both the ACL 11 rule and load-balancing based on source IP address to be followed, the resulting buckets may be:

2.2.*.*000→Device 1
    2.2.*.*001→Device 2
    2.2.*.*010→Device 3
    2.2.*.*011→Device 4
    2.2.*.*100→Device 5
    2.2.*.*101→Device 6
    2.2.*.*110→Device 7
    2.2.*.*111→Device 8

FIG. 4B is an example diagrammatic illustration of TCAM-based load balancing. The network traffic to be forwarded may be sorted based on the matching ACL (e.g., ACL 11) at 450. The traffic may be further sorted by bucket, and forwarded to the appropriate element. In other words, packets may be forwarded to the appropriate element based on the cross-product entry lookup. Because TCAM-based load balancing is software-based, it provides hardware independence. For example, the same method for TCAM-based load balancing may be used for different types of switches.

FIG. 5 is a block diagram of a conventional network environment 500 that is not configured for symmetric service chaining. As shown, A-to-B network traffic (shown in FIG. 5 in dotted line) passes through element E32 506(2) for application 3 shown at reference numeral 502 and element E41 508(1) for application 4 shown at reference numeral 504. However, B-to-A network traffic (shown in FIG. 5 in solid line) passes through elements E42 508(2) for application 4 and element E33 506(2) for application 3. In other words, the network traffic passes through different elements of the same application depending on the direction of the network traffic. Generally, this is not desirable since similar traffic from A-to-B, and from B-to-A, should be load balanced to the same elements. Conventionally, each element may maintain a flow state for a flow in both directions, and this state may be lost if the reverse direction traffic does not pass through the same elements in the reverse path.

Figure 6:
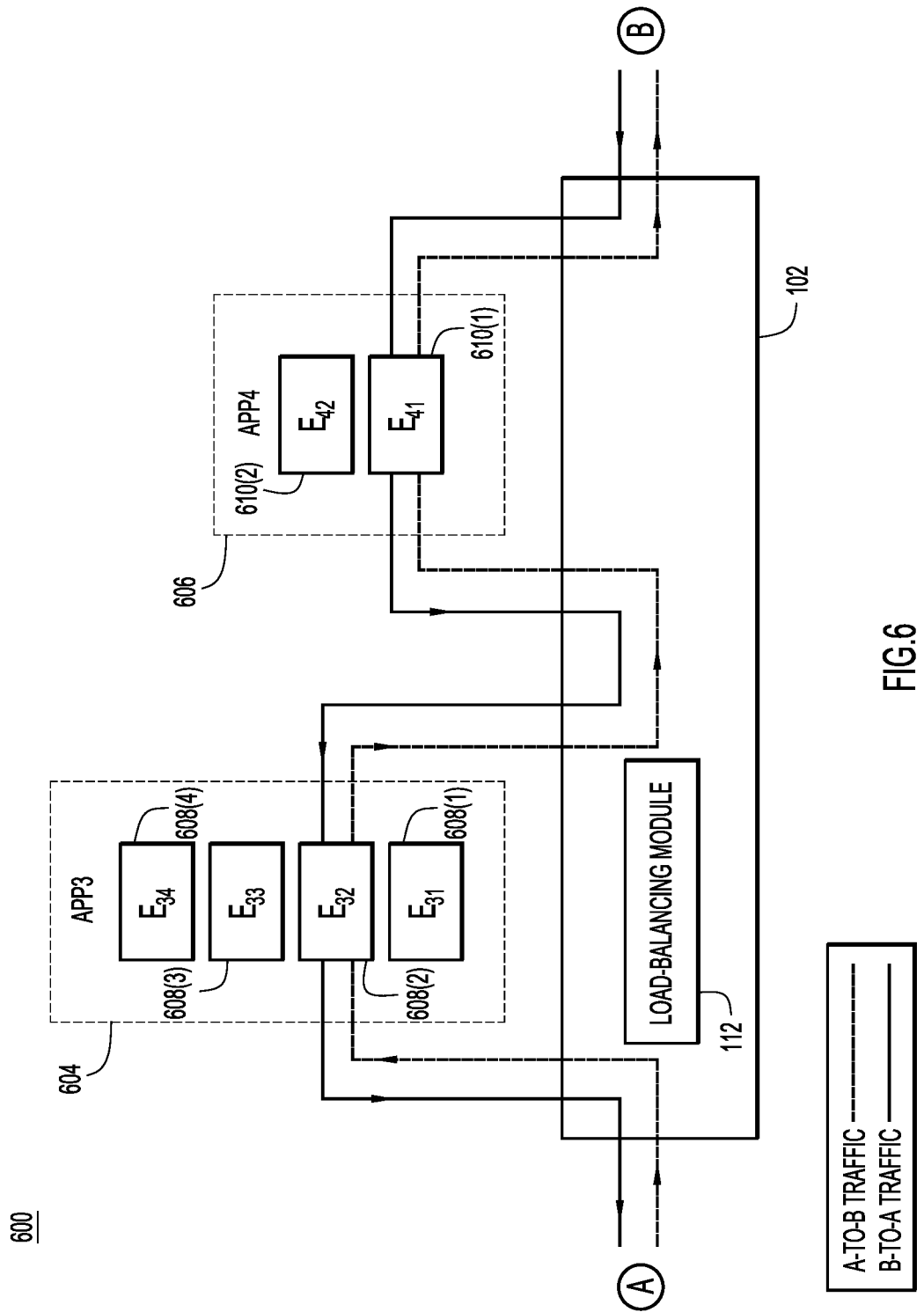
FIG. 6 is a block diagram of a network environment in which a switch is configured to perform symmetric service chaining, according to an example embodiment.

By contrast, FIG. 6 is a block diagram of a network environment 600 in which a switch is configured to perform symmetric service chaining, according to an example embodiment. FIG. 6 illustrates how the load-balancing module 112 may provide symmetrical load balancing according to an example embodiment. As shown in FIG. 6, traffic from A-to-B (shown in FIG. 6 in dotted line) passes through element E32 608(2) for application 3 shown at reference numeral 604 and through element E41 608(1) for application 4 shown at reference numeral 606. Similarly, traffic from B-to-A (shown in FIG. 6 in solid line) passes through element E41 610(1) for application 4 and element E32 608(2) for application 3. In other words, the network traffic passes through the same elements of the same application regardless of the direction of the network traffic. Symmetrical load balancing may be accomplished via hash-based or TCAM-based load balancing.

Figure 7:
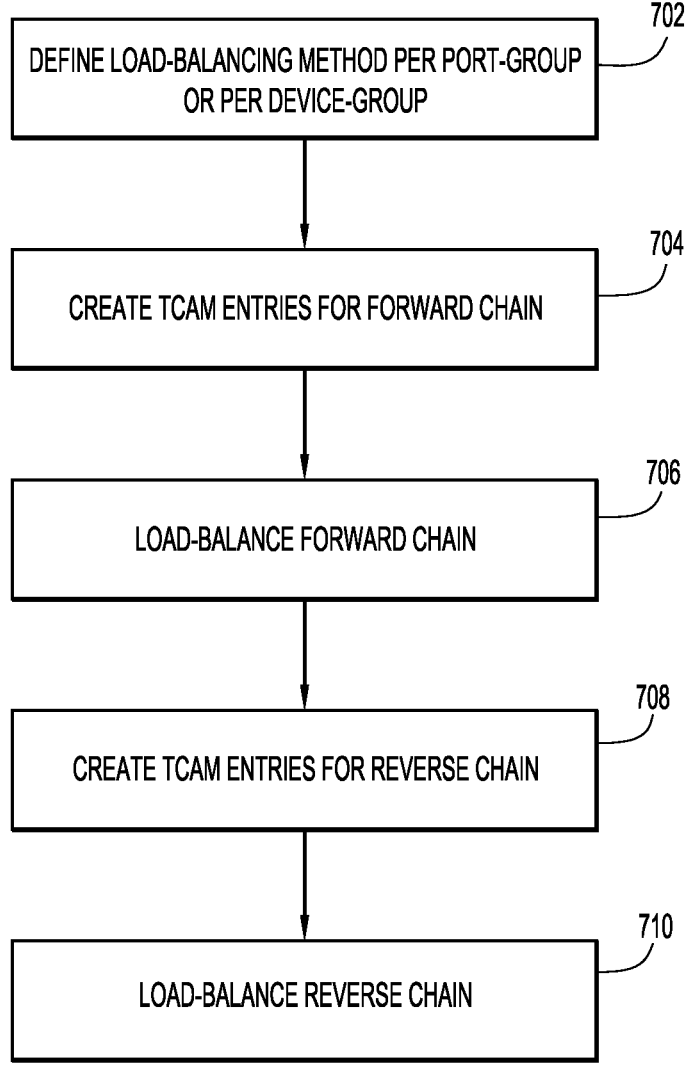
FIG. 7 is a flowchart of a method of performing TCAM-based symmetric load balancing techniques, according to an example embodiment.

FIG. 7 illustrates an example flowchart of a method 700 for TCAM-based symmetric load balancing. At 702, a user may define a load-balancing method per port groups or per device group. At 704, TCAM entries may be created for the forward chain path (e.g., A-to-B). The TCAM entries may be created as shown in FIGS. 4A and 4B. At 706, the forward chain path may be load balanced. For example, the source IP address may be used for load balancing. At 708, TCAM entries for the reverse chain path may also be created as shown in FIGS. 4A and 4B. At 710, the reverse chain path may be load balanced. For example, the destination IP address may be used as for load balancing.

Figure 8A:
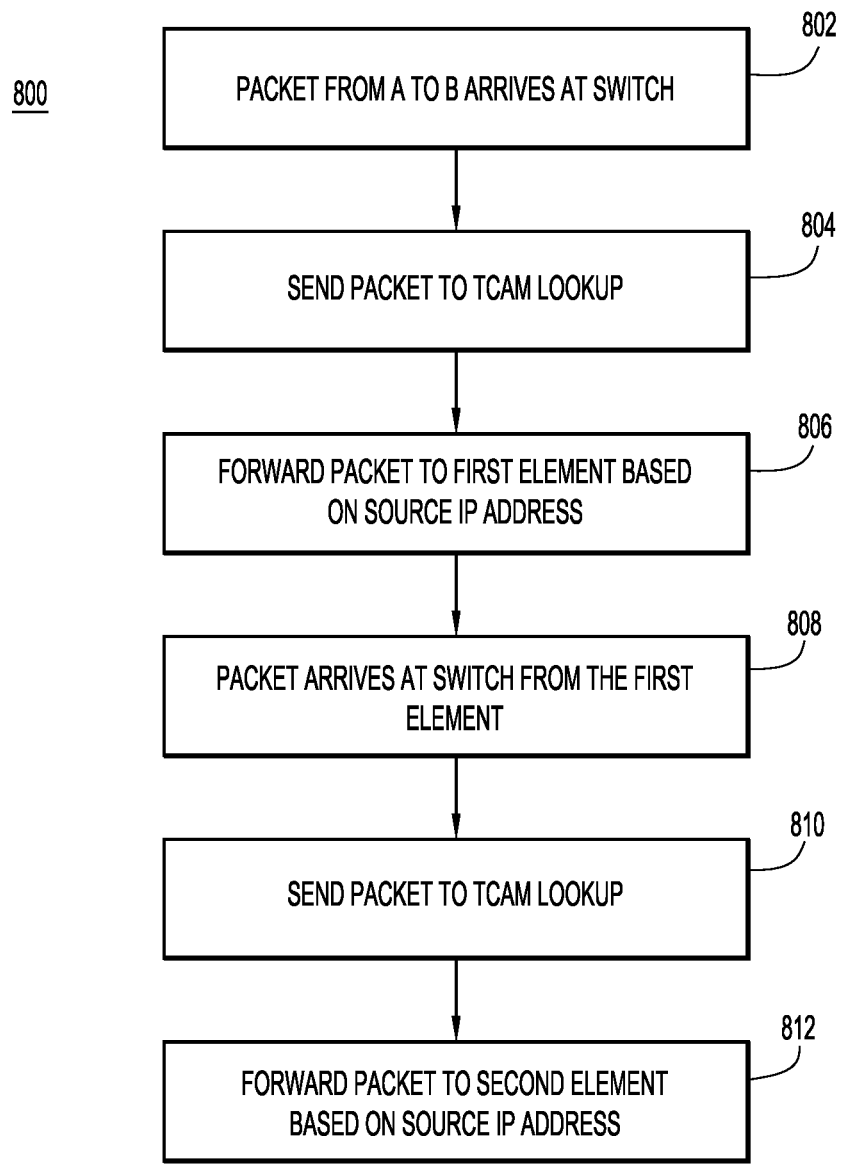
FIGS. 8A and 8B are flowcharts illustrating sample methods of performing TCAM-based symmetric load balancing techniques, according to an example embodiment.
Figure 8B:
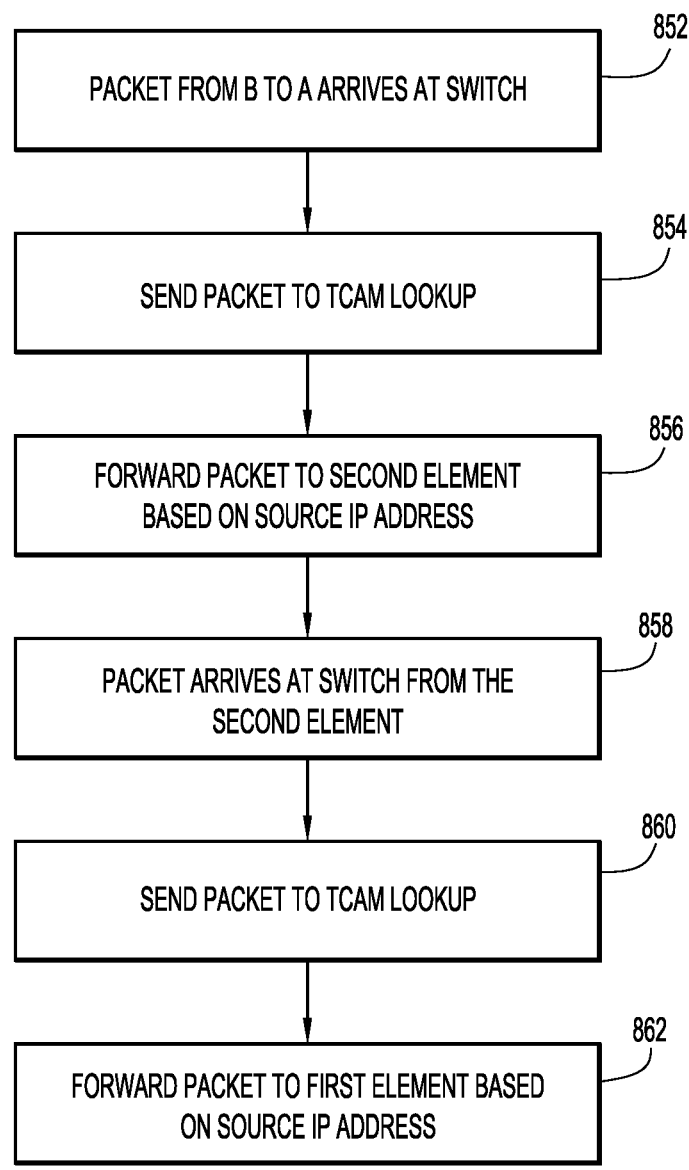

FIGS. 8A and 8B illustrate data path forward and reverse packet flow examples, respectively. Reference is also made to FIG. 6 for purposes of the description of FIGS. 8A and 8B. Referring first to the processing example 800 shown in FIG. 8A, at 802, a packet from A-to-B may arrive at the switch. In this example, A may be 10.1.1.1 and B may be 20.2.2.2. The packet from A-to-B may have a header that includes a source IP address of A, which in this example is 10.1.1.1, and includes a destination address of B, which in this example is 20.2.2.2. At 804, the packet may be sent to a TCAM lookup in the switch. In one example, the source IP address matches element E32 because bits 24-26 are "000". At 806, the packet may be forwarded to element E32 (either in L2 or L3 mode). At 808, the packet may arrive at the switch from element E32. At 810, the packet may be sent to a TCAM lookup in the switch. In this example, the source IP address matches element E41 because bits 24-26 are "000." At 812, the packet may be forwarded to element E41.

With reference to processing example 850 shown in FIG. 8B, at 852, the packet from B-to-A may arrive at the switch. At, 854, the packet may be sent to the TCAM lookup in the switch. In this example, the destination IP address matches element E41 because bits 24-26 are "000." At 856, the packet may be forwarded to element E41 (either in L2 or L3 mode). At 858, the packet may arrive at the switch from element E41. At 860, the packet may be sent to a TCAM lookup in the switch. In this example, the destination IP address matches element E32 because bits 24-26 are "000." At 862, the packet may be forwarded to element E32. Thus, the network traffic passes through the same elements of the same application regardless of the direction of the network traffic.

Figure 9:
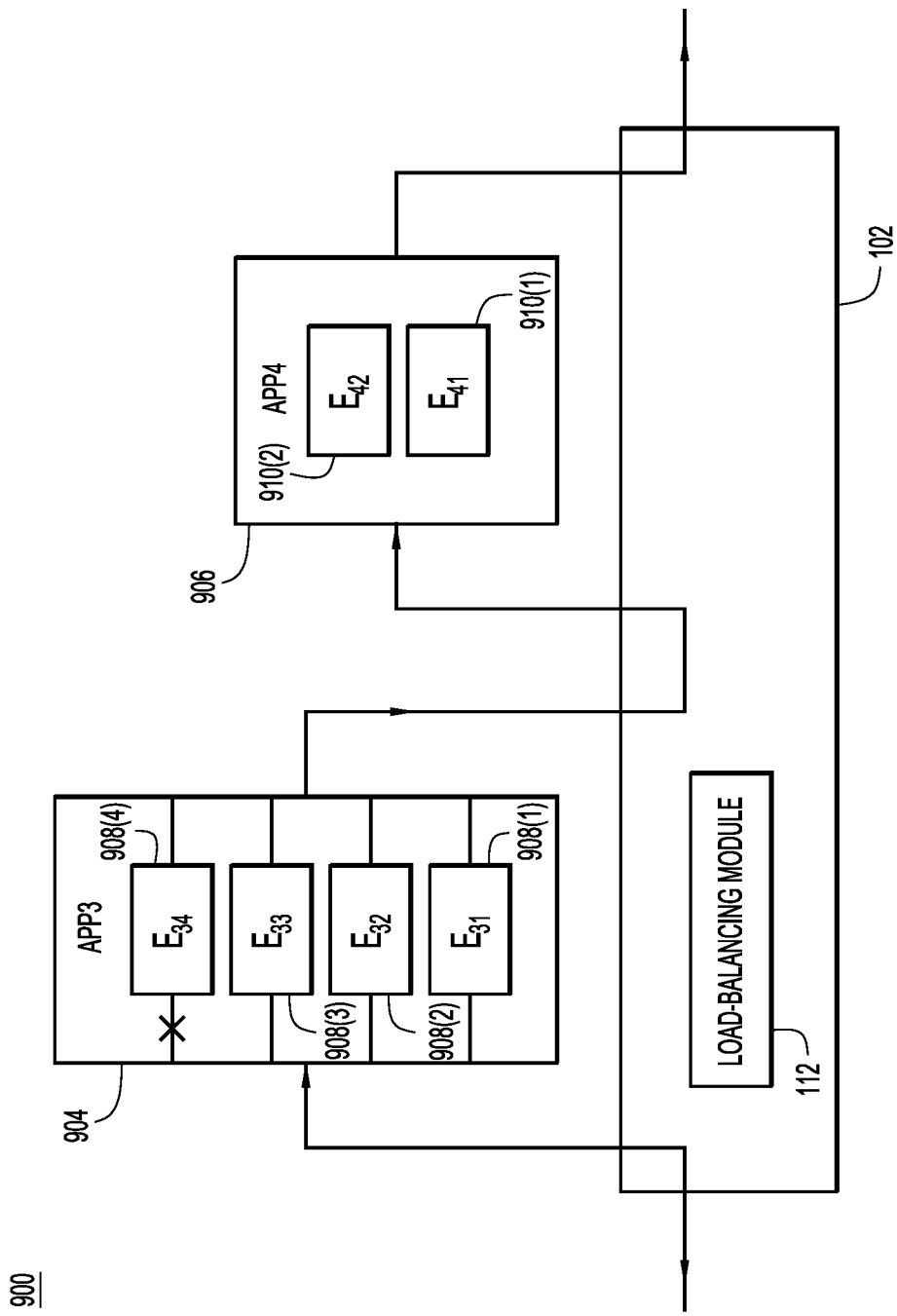
FIG. 9 is a block diagram of a network environment in which a switch is configured for resilient service chaining, according to an example embodiment.

FIG. 9 is a block diagram of a network environment 900 in which a switch is configured for resilient service chaining, according to an example embodiment. FIG. 9 illustrates how the load balancing module 112 on the switch 102 provides resiliency to the service chaining techniques described herein. The term "resiliency" refers to elements of an application continuing to function even when other elements of the application fail. In the example of FIG. 9, the network traffic is initially load-balanced among elements E31-E34 for application 3 shown at 904. This example also includes application 4 shown at 906, which may be serviced by elements E41 910(1) and E42 910(2). When element E34 908(4) fails, network traffic may continue to be load-balanced among elements E31 908(1), E32 908(2), and E33 908(3). Thus, the flows forwarded to elements E31 908(1), E32 908(2), and E33 908(3) remain unaffected. A non-resilient system may rebalance all the flows, not just flows to the failed element E34 908(4). For example, the non-resilient system may modify the number of ports in the port channel (e.g., "x" in the load-balancing formula "hash modulo x" described above) from 4 to 3. A resilient system, for example, may only rebalance the flows to the failed element (e.g., modify the buckets corresponding to the failed element). The elements are typically stateful (e.g., the elements maintain the state of each flow (5-tuple)). Hash-based load balancing may support resiliency if the appropriate mechanism is built into the hardware. TCAM-based load balancing may support resiliency if the appropriate mechanism is defined in the software. For TCAM-based load balancing, the packet lookup may occur in hardware of the switch, but the load-balancing may be controlled by the software.

Figure 10:
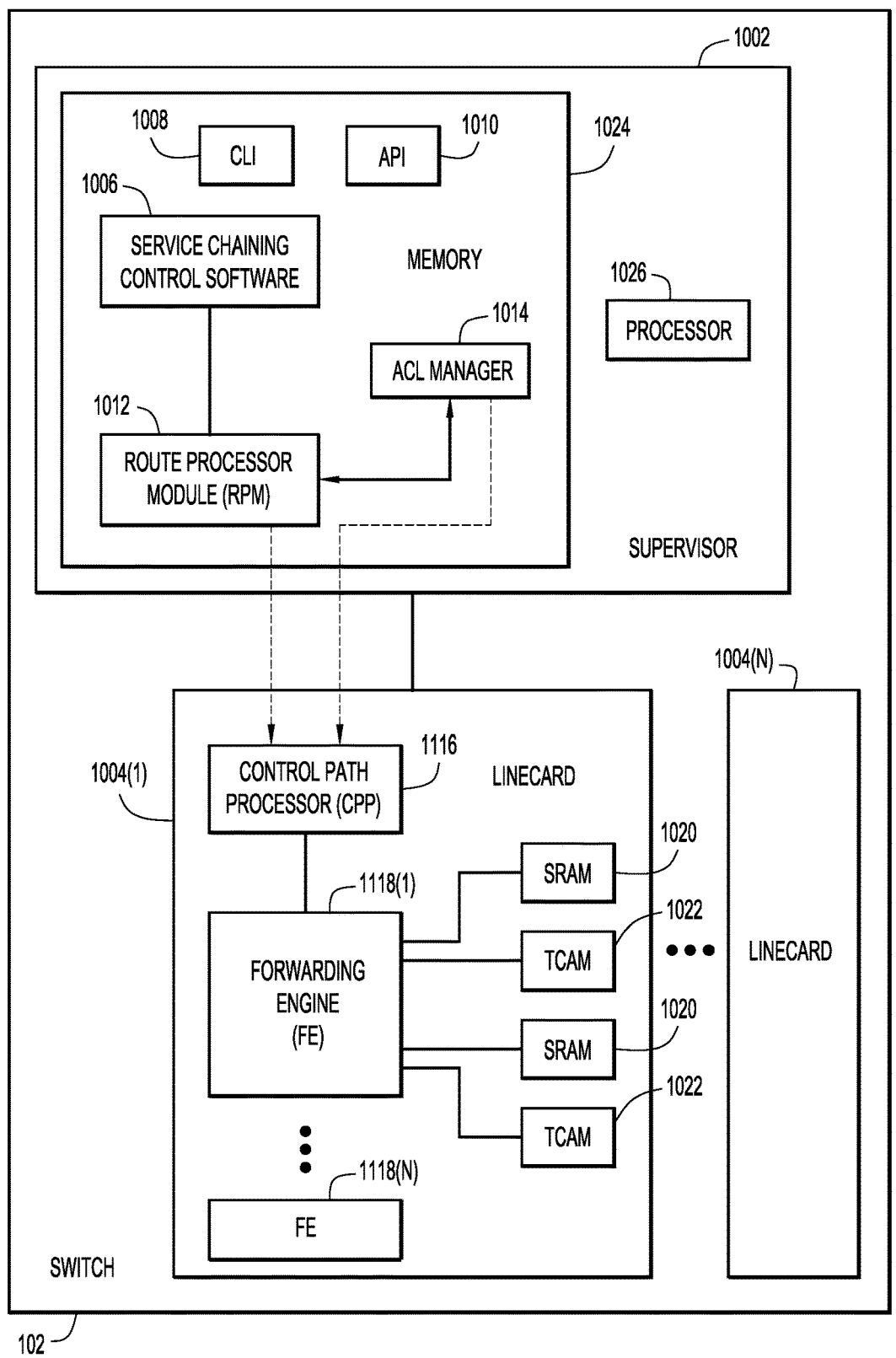
FIG. 10 is a block diagram of a switch configured to support the load balancing techniques presented herein.

FIG. 10 is a block diagram of an example switch 102 configured to perform the load balancing techniques presented herein, in accordance with an example embodiment. The switch 102 includes a supervisor module 1002 and a plurality of linecards 1004(1)-1004(N). The supervisor module 1002 includes various software modules, including a service chaining module 1006. The service chaining module 1006 is configured to communicate with a user interface 1008 (e.g., Command Line Interface (CLI)), an Application Programming Interface (API) 1010 to make the CLI available outside of the switch 102 (e.g., Nx-API), and a Route Process Manager (RPM) 1012 configured to communicate with an ACL manager 1014. The linecards 1004(1)-1004(N) each include a Control Path Processor (CPP) 1016 configured to program a plurality of Forwarding Engines (FEs) 1018(1)-1018(N), which are hardware ASICs. Each FE in a linecard 1004 is associated with multiple instances of Static Random Access Memories (SRAMs) 1020 and TCAMs 1022.

The service chaining module 1006 may be configured to perform selective traffic redirection based on ACL configuration, and may perform the operations of the load balancing module 112 shown in FIGS. 1, 6, and 9. The service chaining module 1006 may perform techniques described herein by causing the RPM 1012 and ACL manager 1014 to configure the linecards 1004(1)-1004(N) by communicating with the CPP 1016 of each linecard. The CPP 1016 may program the FEs in accordance with the examples provided herein. The FEs communicate with TCAMs 1022, which may store respective match ACLs, and the SRAM 1020 may store the action to be taken if there is a match (e.g., to which switch interface (to which an application is connected) to forward a network packet).

The software modules on the supervisor 1002 may be implemented (include instructions encoded) on at least one memory 1024 and the software modules are executed by at least one processor 1026. The memory 1024 may comprise read only memory (ROM), random access memory (RAM), magnetic disk storage media devices, optical storage media devices, flash memory devices, electrical, optical, or other physical/tangible memory storage devices. Thus, in general, the memory 1024 may comprise one or more tangible (non-transitory) computer readable storage media (e.g., a memory device) encoded with software comprising computer executable instructions and when the software is executed (by the controller/processor) it is operable to perform the operations described herein.

FIG. 11 is a flow chart of a method 1100, in accordance with an example embodiment. The method 1100 may be, for example, performed by a network device, such as, for example a switch (e.g., switch 102). At 1102, the network device may store, in at least one hardware module (e.g., a TCAM) of a network device having a plurality of ports, attributes for at least one access control list and associated actions that cause network packets received at one of the plurality of ports that match the attributes for the at least one access control list, to be directed into a service chain that includes at least a first application performed by any one of a first plurality of redundant network processing appliance elements connected to another port of the plurality of ports. At 1104, received network packets that match the attributes for the at least one access control list may be directed into the service chain. At 1106, network packets among the first plurality of redundant network processing appliance elements for the first application based on the attributes stored in the at least one hardware module of the network device may be load balanced.

The service chain may further include at least a second application performed by any one of a second plurality of redundant network processing appliance elements.

The load balancing may include selecting a same one of the first plurality of redundant network processing appliance elements to perform the application on network packets traveling in a forward direction and in a reverse direction through the service chain.

The load balancing may include computing a hash based on at least one of a source internet protocol (IP) address, a destination IP address, or other fields in at least one header of at least one of the network packets. The load balancing may also include determining, based on the hash, a particular one of the first plurality of redundant network processing appliance elements to which to direct the at least one of the network packets.

The load balancing may include generating a port group for the first application. The load balancing may also include generating a port channel for the first application, the port channel including interfaces that correspond to respective redundant elements. The attributes stored in the at least one hardware module of the network device may include a mapping of the hash to an interface that corresponds to the particular one of the first plurality of redundant network processing appliance elements.

Computing the hash may include computing a modulo of a number of interfaces of the port channel.

The method 1100 may also include deleting the port channel in response to received input indicative of removal of the port group.

The load balancing may include generating a device group for the first application. The load balancing may also include generating an equal-cost multi-path (ECMP) list of next hops that includes at least one internet protocol (IP) address of at least one of the first plurality of redundant network processing appliance elements. The load balancing may also include load balancing the network packets among the at least one of the first plurality of redundant network processing appliance elements.

The load balancing may include generating a plurality of buckets based on one or more parameters of each network packet, each bucket corresponding to a possible one of the first plurality of redundant network processing appliance elements. The load balancing may also include identifying access control list entries for the first application. The load balancing may also include determining cross product entries of the access control list entries and the buckets. Each of the cross product entries may match a corresponding one of the network packets. The attributes stored in the at least one hardware module of the network device include the cross product entries. The generating may include generating the buckets based at least on a subset of an internet protocol (IP) address of a network packet.

In summary, in one form, a method is provided comprising: storing, in at least one hardware module of a network device having a plurality of ports, attributes for at least one access control list and associated actions that cause network packets received at one of the plurality of ports that match the attributes for the at least one access control list, to be directed into a service chain that includes at least a first application performed by any one of a first plurality of redundant network processing appliance elements connected to another port of the plurality of ports; directing received network packets that match the attributes for the at least one access control list into the service chain; and load balancing network packets among the first plurality of redundant network processing appliance elements for the first application based on the attributes stored in the at least one hardware module of the network device.

In another form, an apparatus is provided comprising: at least one hardware module of a network device having a plurality of ports, the at least one hardware module configured to store attributes for at least one access control list and associated actions that cause network packets received at one of the plurality of ports that match the attributes for the at least one access control list, to be directed into a service chain that includes at least a first application performed by any one of a first plurality of redundant network processing appliance elements connected to another port of the plurality of ports; and a processor configured to communicate with the at least one hardware module and to direct a received network packet that matches the attributes for the at least one access control list into the service chain and to load balance network packets among the first plurality of redundant network processing appliance elements for the first application based on the attributes stored in the at least one hardware module of the network device.

In still another form, one or more non-transitory computer readable storage media are provided, encoded with instructions that, when executed by a processor, cause the processor to: store, in at least one hardware module of a network device having a plurality of ports, attributes for at least one access control list and associated actions that cause network packets received at one of the plurality of ports that match the attributes for the at least one access control list, to be directed into a service chain that includes at least a first application performed by any one of a first plurality of redundant network processing appliance elements connected to another port of the plurality of ports; direct received network packets that match the attributes for the at least one access control list into the service chain; and load balance network packets among the first plurality of redundant network processing appliance elements for the first application based on the attributes stored in the at least one hardware module of the network device.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    storing, in at least one hardware module of a network device having a plurality of ports, attributes for at least one access control list and associated actions that cause network packets received at one of the plurality of ports that match the attributes for the at least one access control list to be directed into a service chain that includes at least a first application and a second application, the first application performed by any one of a first plurality of redundant network processing appliance elements connected to a second port of the plurality of ports, the second application performed by any one of a second plurality of redundant network processing appliance elements connected to a third port of the plurality of ports;
    directing received network packets that match the attributes for the at least one access control list into the service chain;
    load balancing network packets among the first plurality of redundant network processing appliance elements for the first application based on the attributes stored in the at least one hardware module of the network device, wherein the load balancing includes:
        generating a first port channel for the first application, the first port channel comprising a first plurality of interfaces between the network device and the first plurality of redundant network processing appliance elements, each of the first plurality of interfaces corresponding to a respective one of the first plurality of redundant network processing appliance elements;
        computing a first hash based on:
            a number of the first plurality of interfaces in the first port channel, and
            at least one of a source IP address, a destination IP address, or at least one other field in at least one header of at least one of the network packets; and
        determining, based on the first hash, a particular one of the first plurality of redundant network processing appliance elements to direct the at least one of the network packets,
        wherein the attributes stored in the at least one hardware module of the network device further comprise a mapping of the first hash to a particular one of the first plurality of interfaces corresponding to the particular one of the first plurality of redundant network processing appliance elements; and
    load balancing network packets among the second plurality of redundant network processing appliance elements for the second application based on the attributes stored in the at least one hardware module of the network device, wherein the load balancing includes:
        generating a second port channel for the second application, the second port channel comprising a second plurality of interfaces between the network device and the second plurality of redundant network processing appliance elements, each of the second plurality of interfaces corresponding to a respective one of the second plurality of redundant network processing appliance elements;
        computing a second hash based on:
            a number of the second plurality of interfaces in the second port channel, and
            at least one of a source IP address, a destination IP address, or at least one other field in at least one header of at least one of the network packets; and
        determining, based on the second hash, a particular one of the second plurality of redundant network processing appliance elements to direct the at least one of the network packets,
        wherein the attributes stored in the at least one hardware module of the network device further comprise a mapping of the second hash to a particular one of the second plurality of interfaces corresponding to the particular one of the second plurality of redundant network processing appliance elements.

2. The method of claim 1, wherein the load balancing among the first plurality of redundant network processing appliance elements further includes selecting a same one of the first plurality of redundant network processing appliance elements to perform the first application on network packets traveling in a forward direction and in a reverse direction through the service chain.

3. The method of claim 2, wherein the load balancing among the second plurality of redundant network processing appliance elements further includes selecting a same one of the second plurality of redundant network processing appliance elements to perform the second application on network packets traveling in a forward direction and in a reverse direction through the service chain.

4. The method of claim 1, wherein computing the first hash comprises computing a modulo of the number of the plurality of interfaces in the first port channel.

5. The method of claim 4, wherein computing the second hash comprises computing a modulo of the number of the second plurality of interfaces in the second port channel.

6. The method of claim 1, further comprising:
deleting the first port channel in response to a received input indicative of removal of a port group comprising the first port channel.

7. The method of claim 6, further comprising deleting the second port channel in response to a received input indicative of removal of another port group comprising the second port channel.

8. The method of claim 1, wherein the network device is a switch.

9. An apparatus comprising:
at least one hardware module of a network device having a plurality of ports, the at least one hardware module configured to store attributes for at least one access control list and associated actions that cause network packets received at one of the plurality of ports that match the attributes for the at least one access control list to be directed into a service chain that includes at least a first application and a second application, the first application performed by any one of a first plurality of redundant network processing appliance elements connected to a second port of the plurality of ports, the second application performed by any one of a second plurality of redundant network processing appliance elements connected to a third port of the plurality of ports; and
a processor configured to communicate with the at least one hardware module and to direct a received network packet that matches the attributes for the at least one access control list into the service chain, to load balance network packets among the first plurality of redundant network processing appliance elements for the first application based on the attributes stored in the at least one hardware module of the network device, and to load balance network packets among the second plurality of redundant network appliance processing elements for the second application based on the attributes stored in the at least one hardware module of the network device, wherein the load balancing of the network packets among the first plurality of redundant network processing appliance elements includes:
generating a first port channel for the first application, the first port channel comprising a first plurality of interfaces between the network device and the first plurality of redundant network processing appliance elements, each of the first plurality of interfaces corresponding to a respective one of the first plurality of redundant network processing appliance elements;
computing a first hash based on:
a number of the first plurality of interfaces in the first port channel, and
at least one of a source IP address, a destination IP address, or at least one other field in at least one header of at least one of the network packets; and
determining, based on the first hash, a particular one of the first plurality of redundant network processing appliance elements to direct the at least one of the network packets,
wherein the attributes stored in the at least one hardware module of the network device further comprise a mapping of the first hash to a particular one of the first plurality of interfaces corresponding to the particular one of the first plurality of redundant network processing appliance elements, and
wherein the load balancing of the network packets among the second plurality of redundant network processing appliance elements includes:
generating a second port channel for the second application, the second port channel comprising a second plurality of interfaces between the network device and the second plurality of redundant network processing appliance elements, each of the second plurality of interfaces corresponding to a respective one of the second plurality of redundant network processing appliance elements;
computing a second hash based on:
a number of the second plurality of interfaces in the second port channel, and
at least one of a source IP address, a destination IP address, or at least one other field in at least one header of at least one of the network packets; and
determining, based on the second hash, a particular one of the second plurality of redundant network processing appliance elements to direct the at least one of the network packets,
wherein the attributes stored in the at least one hardware module of the network device further comprise a mapping of the second hash to a particular one of the second plurality of interfaces corresponding to the particular one of the second plurality of redundant network processing appliance elements.

10. The apparatus of claim 9, wherein the load balancing among the first plurality of redundant network processing appliance elements further comprises selecting a same one of the first plurality of redundant network processing appliance elements to perform the first application on network packets traveling in a forward direction and in a reverse direction through the service chain.

11. The apparatus of claim 10, wherein the load balancing among the second plurality of redundant network processing appliance elements further comprises selecting a same one of the second plurality of redundant network processing appliance elements to perform the second application on network packets traveling in a forward direction and in a reverse direction through the service chain.

12. The apparatus of claim 9, wherein the processor is further configured to compute the first hash by computing a modulo of the number of the first plurality of interfaces in the first port channel.

13. The apparatus of claim 12, wherein the processor is further configured to compute the second hash by computing a modulo of the number of the second plurality of interfaces in the second port channel.

14. The apparatus of claim 9, wherein the processor is further configured to delete the first port channel in response to a received input indicative of removal of a port group comprising the first port channel.

15. One or more non-transitory computer readable storage media encoded with instructions that, when executed by a processor, cause the processor to:
store, in at least one hardware module of a network device having a plurality of ports, attributes for at least one access control list and associated actions that cause network packets received at one of the plurality of ports that match the attributes for the at least one access control list to be directed into a service chain that includes at least a first application and a second application, the first application performed by any one of a first plurality of redundant network processing appliance elements connected to a second port of the plurality of ports, the second application performed by any one of a second plurality of redundant network processing appliance elements connected to a third port of the plurality of ports;
direct received network packets that match the attributes for the at least one access control list into the service chain;
load balance network packets among the first plurality of redundant network processing appliance elements for the first application based on the attributes stored in the at least one hardware module of the network device, wherein the load balancing includes:
generating a first port channel for the first application, the first port channel comprising a first plurality of interfaces between the network device and the first plurality of redundant network processing appliance elements, each of the first plurality of interfaces corresponding to a respective one of the first plurality of redundant network processing appliance elements;
computing a first hash based on:
a number of the first plurality of interfaces in the first port channel, and
at least one of a source IP address, a destination IP address, or at least one other field in at least one header of at least one of the network packets; and
determining, based on the first hash, a particular one of the first plurality of redundant network processing appliance elements to direct the at least one of the network packets,
wherein the attributes stored in the at least one hardware module of the network device further comprise a mapping of the first hash to a particular one of the first plurality of interfaces corresponding to the particular one of the first plurality of redundant network processing appliance elements; and
load balancing network packets among the second plurality of redundant network processing appliance elements for the second application based on the attributes stored in the at least one hardware module of the network device, wherein the load balancing includes:
generating a second port channel for the second application, the second port channel comprising a second plurality of interfaces between the network device and the second plurality of redundant network processing appliance elements, each of the second plurality of interfaces corresponding to a respective one of the second plurality of redundant network processing appliance elements;
computing a second hash based on:
a number of the second plurality of interfaces in the port channel, and
at least one of a source IP address, a destination IP address, or at least one other field in at least one header of at least one of the network packets; and
determining, based on the second hash, a particular one of the second plurality of redundant network processing appliance elements to direct the at least one of the network packets,
wherein the attributes stored in the at least one hardware module of the network device further comprise a mapping of the second hash to a particular one of the second plurality of interfaces corresponding to the particular one of the second plurality of redundant network processing appliance elements.

16. The one or more non-transitory computer readable storage media of claim 15, wherein the instructions cause the processor to load balance the network packets among the first plurality of redundant network processing appliance elements by selecting a same one of the first plurality of redundant network processing appliance elements to perform the first application on network packets traveling in a forward direction and in a reverse direction through the service chain.

17. The one or more non-transitory computer readable storage media of claim 16, wherein the instructions cause the processor to load balance the network packets among the second plurality of redundant network processing appliance elements by selecting a same one of the second plurality of redundant network processing appliance elements to perform the second application on network packets traveling in a forward direction and in a reverse direction through the service chain.

18. The one or more non-transitory computer readable storage media of claim 15, wherein the instructions cause the processor to compute the first hash by computing a modulo of the number of the first plurality of interfaces in the first port channel.

19. The one or more non-transitory computer readable storage media of claim 18, wherein the instructions cause the processor to compute the second hash by computing a modulo of the number of the second plurality of interfaces in the second port channel.

20. The one or more non-transitory computer readable storage media of claim 15, wherein the instructions cause the processor to delete the first port channel in response to a received input indicative of removal of a port group comprising the first port channel.

* * * * *